United States Patent
Boulgakova (10) Patent No.: US 11,174,062 B1
(45) Date of Patent: Nov. 16, 2021

(54) INTERCHANGEABLE VACUUM-SEALED BEVERAGE BOTTLE AND ASSOCIATED METHODS

(71) Applicant: Irina Boulgakova, St. Augustine, FL (US)

(72) Inventor: Irina Boulgakova, St. Augustine, FL (US)

(*) Notice: Subject to any disclaimer, the term of this patent is extended or adjusted under 35 U.S.C. 154(b) by 176 days.

(21) Appl. No.: 16/573,917

(22) Filed: Sep. 17, 2019

Related U.S. Application Data (60) Provisional application No. 62/732,005, filed on Sep. 17, 2018.

(51) Int. Cl.
| | | |
|---|---|---|
| *B65D 1/06* | (2006.01) | |
| *B65D 1/02* | (2006.01) | |
| *B65D 51/28* | (2006.01) | |
| *B65D 81/38* | (2006.01) | |

(52) U.S. Cl.
CPC .......... *B65D 1/06* (2013.01); *B65D 1/0246* (2013.01); *B65D 51/2864* (2013.01); *B65D 81/3841* (2013.01)

(58) Field of Classification Search
CPC ...... B65D 77/0426; B65D 77/04; B65D 1/06; B65D 1/0246; B65D 81/3841; B65D 51/2864; B65D 47/068; B65D 47/30; B65D 59/02; B65D 59/06; B65D 77/208; B65D 2251/09; B65D 49/02; B65D 81/38; A47J 41/02

See application file for complete search history.

(56) References Cited

U.S. PATENT DOCUMENTS

| | | | | |
|---|---|---|---|---|
| 5,046,409 A | * | 9/1991 | Henn | A47J 31/06 |
| | | | | 99/307 |
| 5,308,482 A | * | 5/1994 | Mead | C02F 1/003 |
| | | | | 210/207 |
| 5,562,824 A | * | 10/1996 | Magnusson | C02F 1/003 |
| | | | | 210/266 |
| 7,441,665 B2 | * | 10/2008 | Bridges | C02F 1/50 |
| | | | | 210/232 |
| 9,555,948 B2 | * | 1/2017 | Nemeth | B23K 31/02 |
| 2005/0211712 A1 | * | 9/2005 | Moran | B65D 23/0857 |
| | | | | 220/592.17 |
| 2006/0237464 A1 | * | 10/2006 | Lin | A47J 41/02 |
| | | | | 220/592.27 |
| 2010/0263549 A1 | * | 10/2010 | Lee | A47J 31/18 |
| | | | | 99/319 |
| 2013/0320011 A1 | * | 12/2013 | Tachi | A47J 41/0027 |
| | | | | 220/212 |

\* cited by examiner

*Primary Examiner* — Kareen K Thomas
(74) *Attorney, Agent, or Firm* — Ashkan Najafi (57) ABSTRACT

An interchangeable, vacuum-sealed beverage bottle includes a body having a cap housing, a plug assembly disposed at the cap housing, a handle engaged to the cap housing, an inner flask in fluid communication with the plug assembly, and an outer flask sealed to the inner flask such that a sealed vacuum cavity is defined between an outer surface of the inner flask and an inner surface of the outer flask (single liquid-containing chamber is double-walled and a vacuum is created between the walls). An exterior cover is positioned about the inner flask and the outer flask, and an end cap mated to the exterior cover and the outer flask. Downward and upward axial displacement of a portion of the plug assembly permits and prohibits fluid to freely flow outwardly from the inner flask to an exterior of the plug assembly, respectively.

12 Claims, 11 Drawing Sheets

INTERCHANGEABLE VACUUM-SEALED BEVERAGE BOTTLE AND ASSOCIATED METHODS

CROSS REFERENCE TO RELATED APPLICATIONS

This is a non-provisional patent application that claims the benefit of co-pending U.S. provisional patent application No. 62/732,005 filed Sep. 17, 2018, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to portable beverage bottle and, more particularly, to a specially designed interchangeable vacuum-sealed beverage bottle including interchangeable/replaceable components that can be changed after extended use.

Prior Art

The versatility of single-compartment bottles comes into question in daily use due to the following reasons. None of the existing single-compartment bottles are capable of being accessed for cleaning in ways that are convenient to their users. Conventional single-compartment bottles are typically characterized by containers which are not easily accessible using cleaning brushes and co-located access points. Often times, the openings of such containers are relatively small compared to the volume the containers hold or a cross-sectional area of the containers. Constant or frequent use of bottles can lead to the repetitive need for cleaning. Such bottles do not have interchangeable/replaceable components.

If conventional bottles are left with standing fluid or water within them, mold, mildew, or bacteria develops and can lead to difficult cleaning and, possibly, health-related problems for the user. Conventional bottles have at least one single top or cap that is often removable by unscrewing or exerting upward pressure to separate the top or cap from the body of the bottle. However, due to the design and shape of conventional bottles, comprehensive cleaning is difficult. Again, no interchangeable/replaceable components are readily available.

Furthermore, single-compartment bottles having juxtaposed containers and opposingly disposed access points present challenges in daily use because it is unintuitive the means by which the contents are accessed or the means by which, upon removal, the various parts of the single-compartment bottles should be placed in a condition to avoid contamination.

Accordingly, a need remains for an interchangeable vacuum-sealed beverage bottle in order to overcome at least one of the above-noted shortcomings. The exemplary embodiment(s) satisfy such a need by a specially designed interchangeable vacuum-sealed beverage bottle that is convenient and easy to use, lightweight yet durable in design, versatile in its applications, and designed to include interchangeable/replaceable components that can be changed after extended use

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially designed interchangeable vacuum-sealed beverage bottle including interchangeable/replaceable components that can be changed after extended use. These and other objects, features, and advantages of the non-limiting exemplary embodiment(s) are provided by a interchangeable, vacuum-sealed beverage bottle includes a body provided with a centrally registered longitudinal axis. Such a body includes a cap housing, a plug assembly disposed at the cap housing, a handle engaged to a bottom portion of the cap housing, an inner flask having a first open top end in fluid communication with the plug assembly, and an outer flask sealed to the inner flask such that a sealed vacuum cavity is defined between an outer surface of the inner flask and an inner surface of the outer flask (e.g., single liquid-containing chamber is double-walled and a vacuum is created between the walls). In this manner, the inner flask is statically and permanently coupled to the outer flask.

The body further includes an exterior cover removably positioned about the inner flask and the outer flask, and an end cap detachably mated to the exterior cover and the outer flask. Advantageously, downward and upward axial displacement of a portion of the plug assembly permits and prohibits fluid to freely flow outwardly from the inner flask to an exterior of the plug assembly, respectively.

In a non-limiting exemplary embodiment, the inner flask stores one type of liquid at a time. The inner flask and outer flask are sealed together and are removable from the cover thereby providing a quick-detachable combined flask. The inner and outer flasks are welded at their bottoms and tops. To remove the combined flasks (e.g., welded inner and outer flasks), the user must unscrew the bottom and simply remove the combined flasks. The combined flasks can have a different color, can be purchased separately, and replaced by the user as needed.

In a non-limiting exemplary embodiment, the plug assembly includes a close button having a central aperture and located at an upper portion of the body, an open button centrally aligned within an inner perimeter of the central aperture, an actuator engaged with the open button and extended downwardly therefrom, a stator having a central passageway and a plurality of finger-like protrusions equidistantly spaced about the central passageway, and a valve housing containing the close button, the open button, and the stator therein. Notably, the actuator is partially disposed exterior of an open bottom end of the valve housing. The plug assembly further includes a valve having a central protrusion extended upwardly towards the actuator and aligned with the centrally registered longitudinal axis, a washer engaged with a top portion of the central protrusion and juxtaposed subjacent to the actuator, a spring positioned about the central protrusion and being selectively compressed and decompressed when the open button is reciprocated between a tensioned position and a resting position, respectively, and a first seal seated about a lower portion of the valve and engaged with the inner flask.

The plug assembly acts as a valve and provides an ergonomic mouth for drinking, which also functions as a stopper closing the neck of the bottle. When drinking, a valve is opened to quickly fill the bottle. Additionally, a user can unscrew the plug assembly from the inner flask and pour the liquid through the neck of the bottle. To open the plug assembly and drink liquid, press the central open button, after drinking, press the outer ring (e.g., close button) to close the plug assembly.

Figure 6:
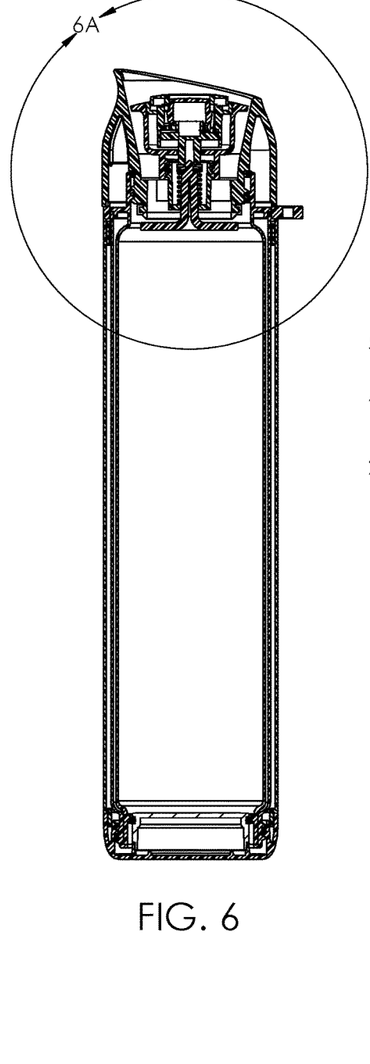
FIG. 6 is a cross-sectional view taken along line 3A-3A in FIG. 3 wherein section 6A is taken after an open button is pressed at the plug assembly.
Figure 6A:
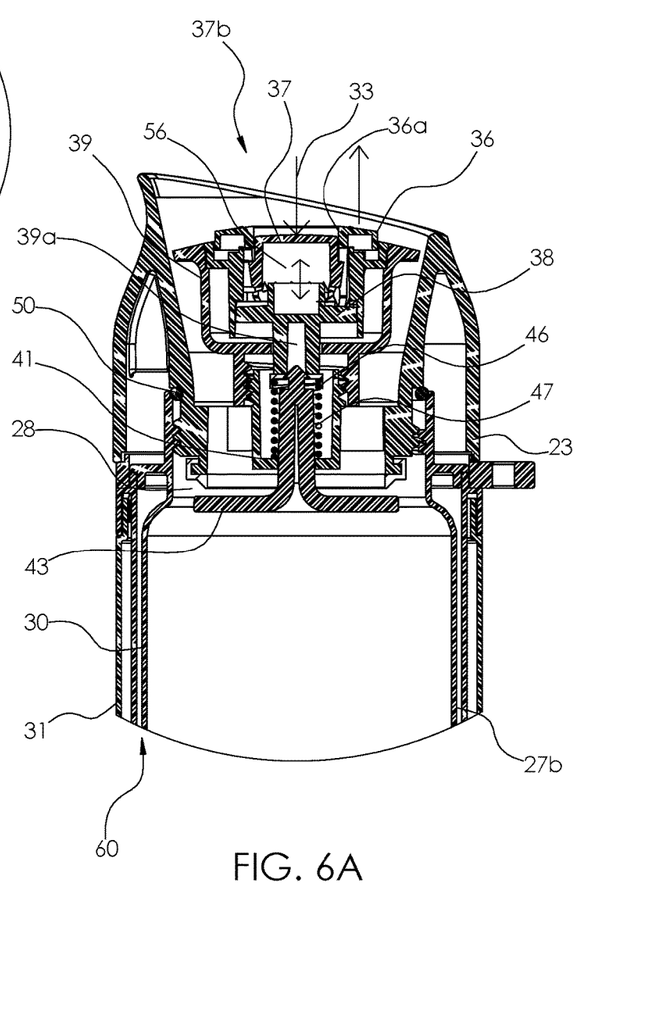
FIG. 6A is an enlarged view of section 6A taken in FIG. 6.
Figure 7:
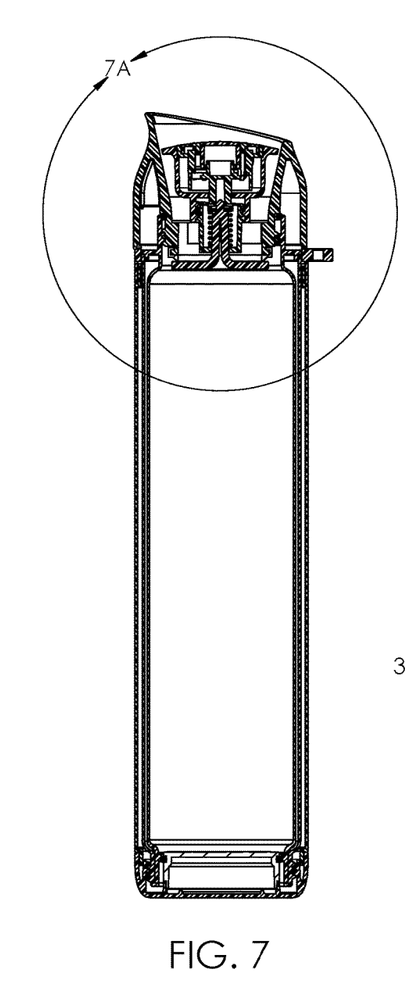
FIG. 7 is a cross-sectional view taken along line 3A-3A in FIG. 3 wherein section 7A is taken after an open button is released at the plug assembly.
Figure 7A:
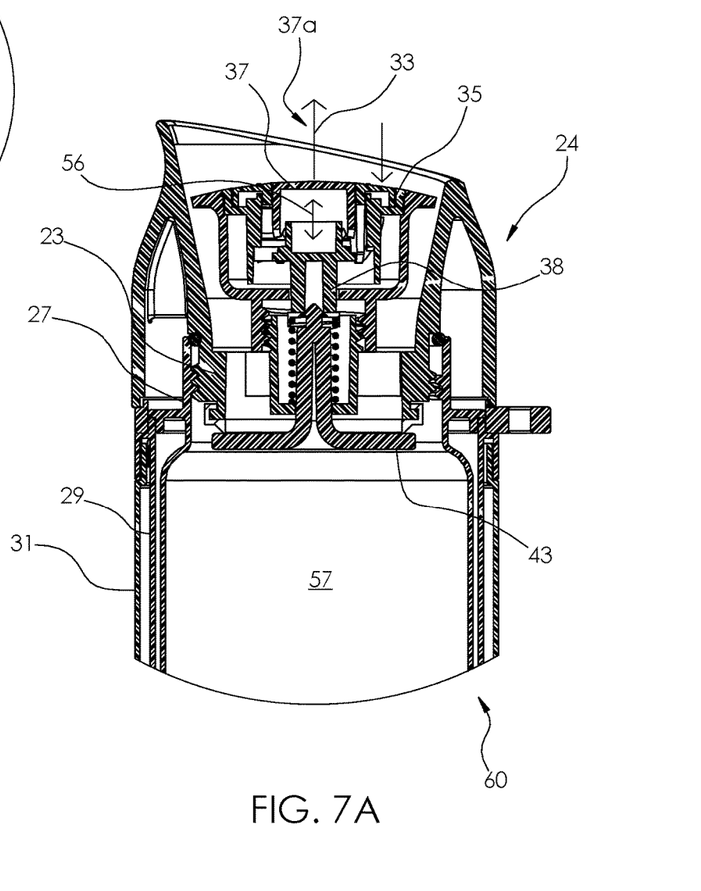
FIG. 7A is an enlarged view of section 7A taken in FIG. 7.
Figure 11:
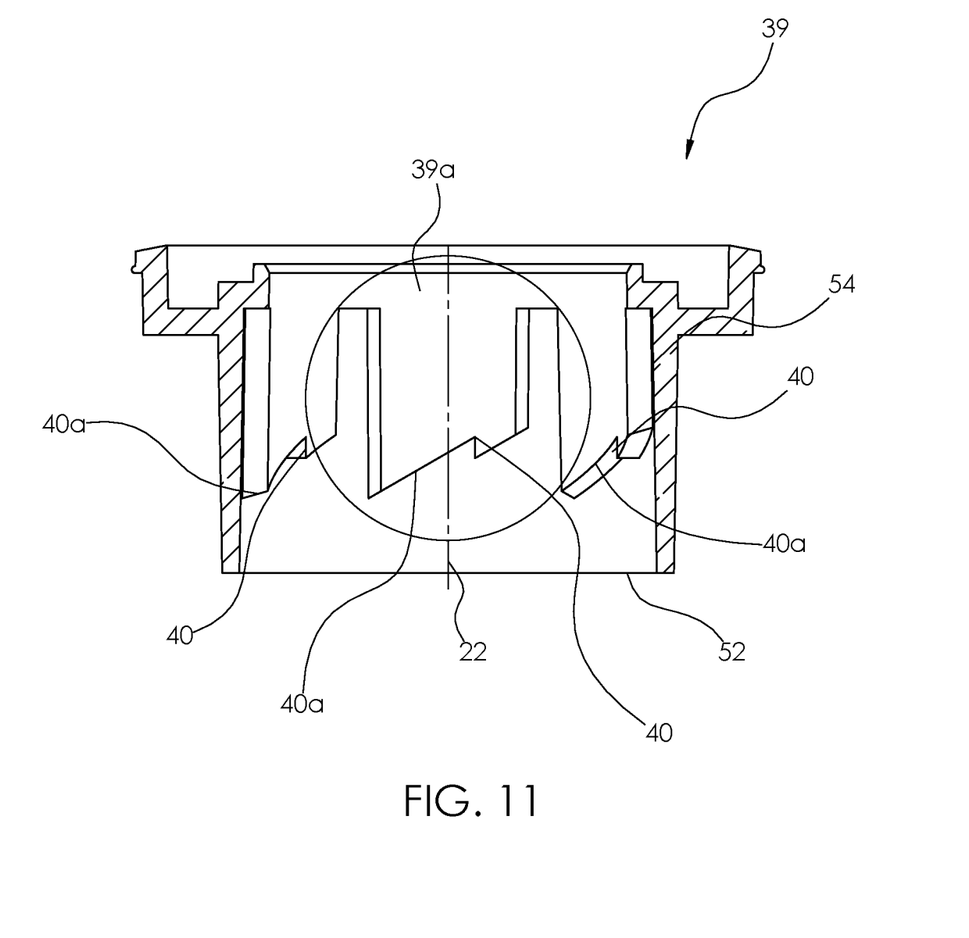
FIG. 11 is an enlarged cross-sectional view of the stator shown in FIG. 2.
Figure 12:
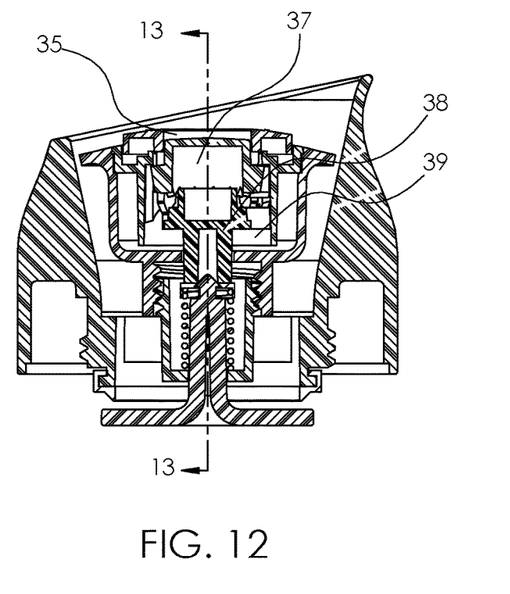
FIG. 12 is an enlarged cross-sectional view of the plug assembly wherein the open button is pressed downwardly.
Figure 13:
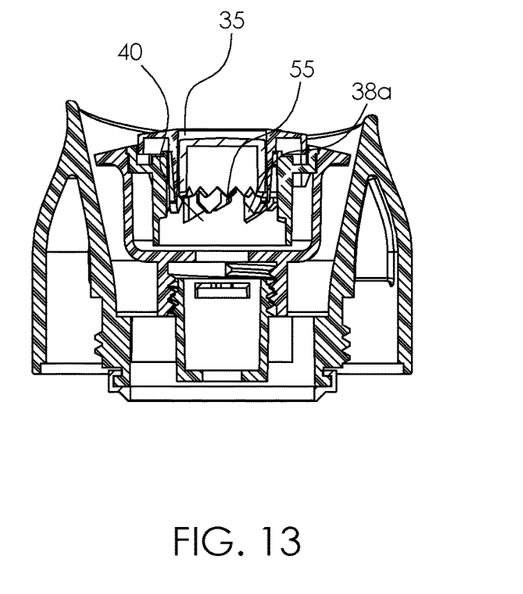
FIG. 13 is an enlarged cross-sectional view of the plug assembly wherein the open button is pressed downwardly.
Figure 14:
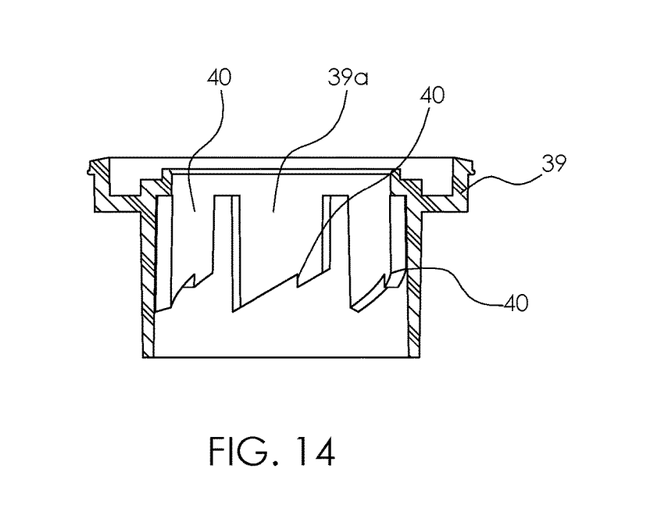
FIG. 14 is another enlarged cross-sectional view of the stator shown in FIGS. 12 and 13.

As perhaps best shown in FIGS. 6A, 7A, and 11-14, when the open button is pressed, the actuator also moves down and simultaneously rotates due to the angularly offset protrusions of the stator. At the end of its movement, the actuator is blocked by the protrusions on the stator and thus the valve remains in the pressed (lowered) open position because the open button cannot rise upwardly (the open button is coupled to the actuator). Such protrusions are equidistantly offset from the centrally registered longitudinal axis and preferably obliquely angled at approximately 45 degrees relative to a horizontal plane, as shown in FIGS. 11-14. Such protrusions create a serrated edge extending about an annular perimeter of the stator. The protrusions frictionally engage the actuator when the open button is pressed downwardly. In this position, the actuator blades come into contact with the protruding arms of the close button and lift the close button (see FIG. 13) relative to a resting equilibrium position. Thus, while the valve is open (open button pressed down and the actuator is locked), the close button remains raised. Pressing down the close button disengages the actuator from the stator and releases the open button to rise upwardly to its original equilibrium position.

In a non-limiting exemplary embodiment, the open button, the close button, and the actuator are operably coupled to the stator.

In a non-limiting exemplary embodiment, the open button is selectively reciprocated between the resting position and the tensioned position along a linear travel path oriented parallel to the centrally registered longitudinal axis.

In a non-limiting exemplary embodiment, the close button is elevated above the resting position of the open button when the open button is downwardly displaced to the tensioned position. In this manner, the open button is caused to rise along the linear travel path when the close button is depressed downwardly.

Drinking liquid flows through the cavity of the inner flask. This cavity and the plug assembly minimize the "dead volume" in which liquid can accumulate after drinking. This eliminates the sudden flow of liquids and the blotting of things in which the bottle is transported.

The plug assembly and the end cap seal the bottle by means of O-rings. The sealing mechanism is designed in such a way that, when screwing the parts, the sealing rings, the end cap and the plug assembly are mainly subjected to tangential forces for separation, which makes it more comfortable to twist the end cap and the plug assembly without "stopping" into the seal or damaging the seal.

In a non-limiting exemplary embodiment, the inner flask includes a first hollow cavity (containing a single liquid), and a first open bottom end axially opposed from the first open top end.

In a non-limiting exemplary embodiment, the outer flask includes a second open top end and a second open bottom end axially opposed therefrom. Notably, the sealed vacuum cavity is disposed about an outer perimeter of the inner flask and extended along a major longitudinal length of the outer flask.

Advantageously, the inner flask directly contains drinking liquids and has a double wall. Such a double wall is created with the outer flask, and an inner space created a vacuum-sealed cavity at zero air pressure to maintain the temperature of the drinking liquid filled into the inner flask. The inner flask and outer flask are connected by ultrasonic welding thereby forming the vacuum cavity.

In a non-limiting exemplary embodiment, the sealed vacuum cavity surrounds and entire circumferential outer perimeter of the inner flask and thereby insulates the liquid housed inside the inner flask.

In a non-limiting exemplary embodiment, the exterior cover includes a third open top end and a third open bottom end axially opposed therefrom. In this manner, each of the inner flask and the outer flask are removably situated between the third open top end and the third open bottom end.

In a non-limiting exemplary embodiment, the end cap includes a threaded inner wall and an outer wall concentrically and equidistantly spaced about the threaded inner wall, an insert centrally disposed at the end cap and equidistantly spaced inwardly from the threaded inner wall, and a second seal circumscribed about the insert. Advantageously, the threaded inner wall is removably coupled to the second open bottom end of the outer flask, wherein the outer wall is frictionally engaged with the third open bottom end of the exterior cover.

At an upper portion of the bottle, beneath the plug assembly, a quick-detachable ring is position. The ring (e.g., handle) can serve as a handle or attach to a belt, for example, to easily carry the bottle. The ring is worn on the body of the bottle and is centered by a stopper-valve. Thus, the ring can be located in any convenient angular position, and easily replaced if necessary. The ring can be made in different colors.

The present disclosure further includes a method for utilizing a beverage bottle including the initial step of: providing a body provided with a centrally registered longitudinal axis wherein the body includes a cap housing, a plug assembly adjustably disposed at the cap housing, a handle engaged to a bottom portion of the cap housing, an inner flask having a first open top end in fluid communication with the plug assembly, an outer flask sealed to the inner flask such that a sealed vacuum cavity is defined between an outer surface of the inner flask and an inner surface of the outer flask, an exterior cover removably positioned about the inner flask and the outer flask, and an end cap detachably mated to the exterior cover and the outer flask. Advantageously, the inner flask is statically and permanently coupled to the outer flask. The method further includes the step of: axially displacing of a portion of the plug assembly downwardly and upwardly thereby permitting and prohibiting fluid to freely flow outwardly from the inner flask to an exterior of the plug assembly, respectively.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means ±15% of the numerical.

If used herein, "substantially" means largely if not wholly that which is specified but so close that the difference is insignificant.

Figure 1:
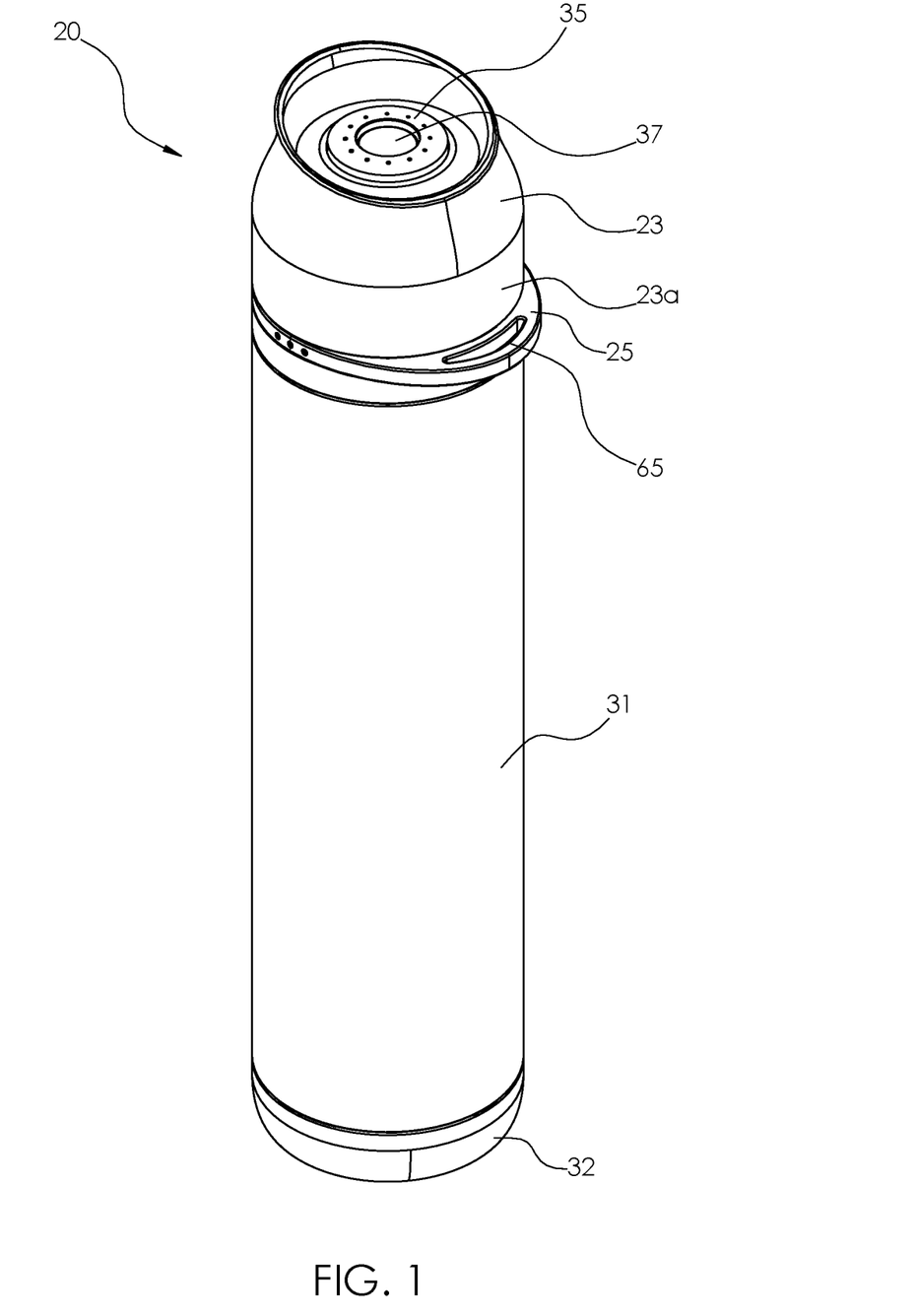
FIG. 1 is a perspective view of a vacuum-sealed beverage bottle having replaceable/interchangeable components wherein the open button is depressed, in accordance with non-limiting exemplary embodiment(s) of the present disclosure.
Figure 2:
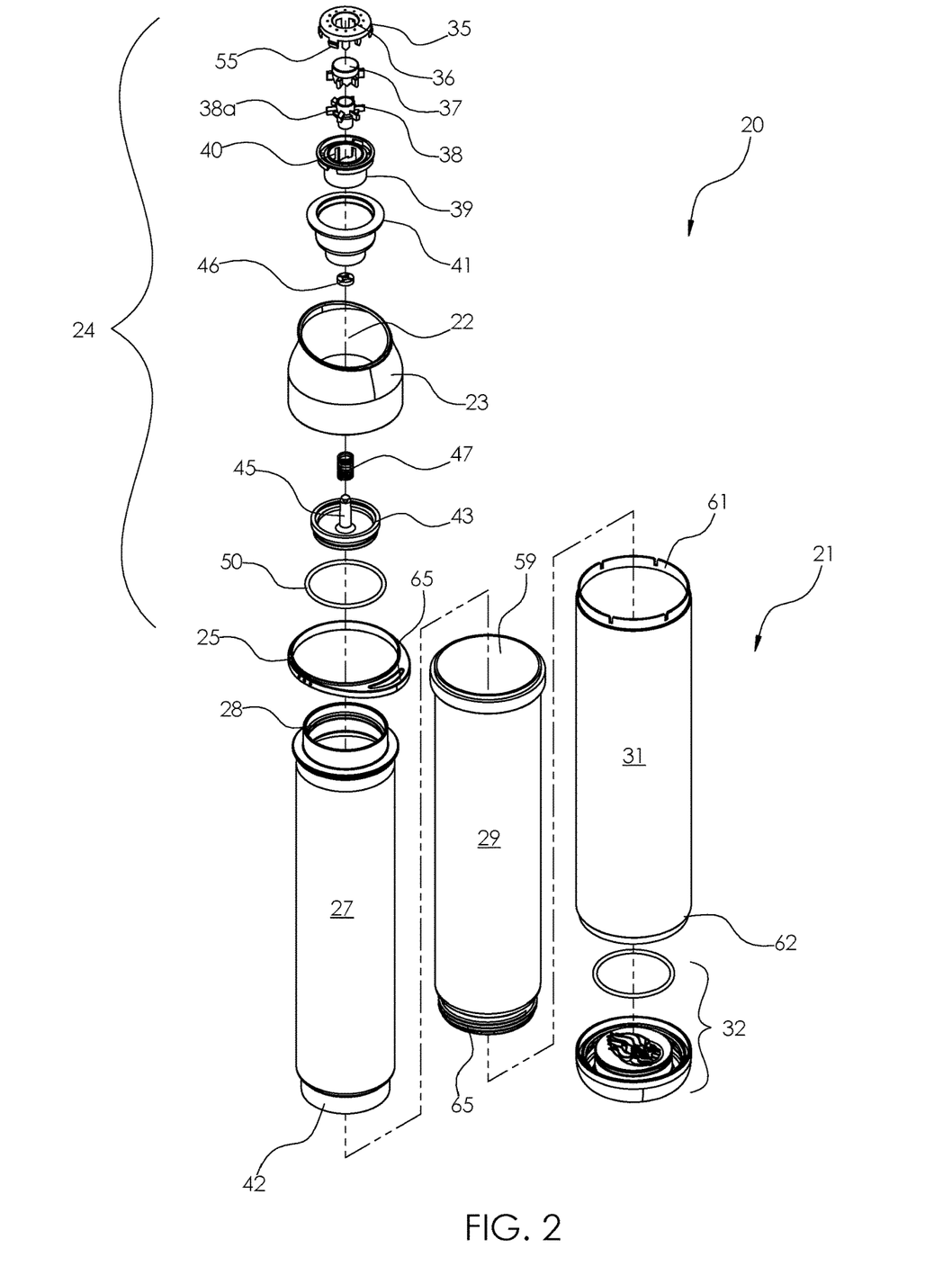
FIG. 2 is an exploded view of the vacuum-sealed beverage bottle shown in FIG. 1.
Figure 3:
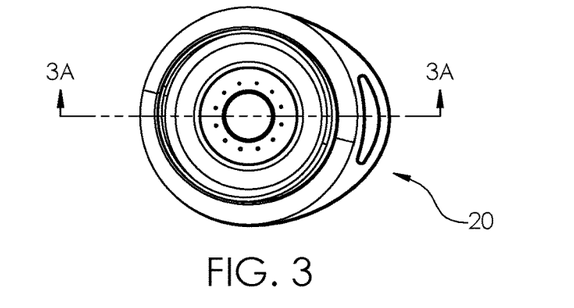
FIG. 3 is a top plan view of the vacuum-sealed beverage bottle shown in FIG. 1.
Figure 3A:
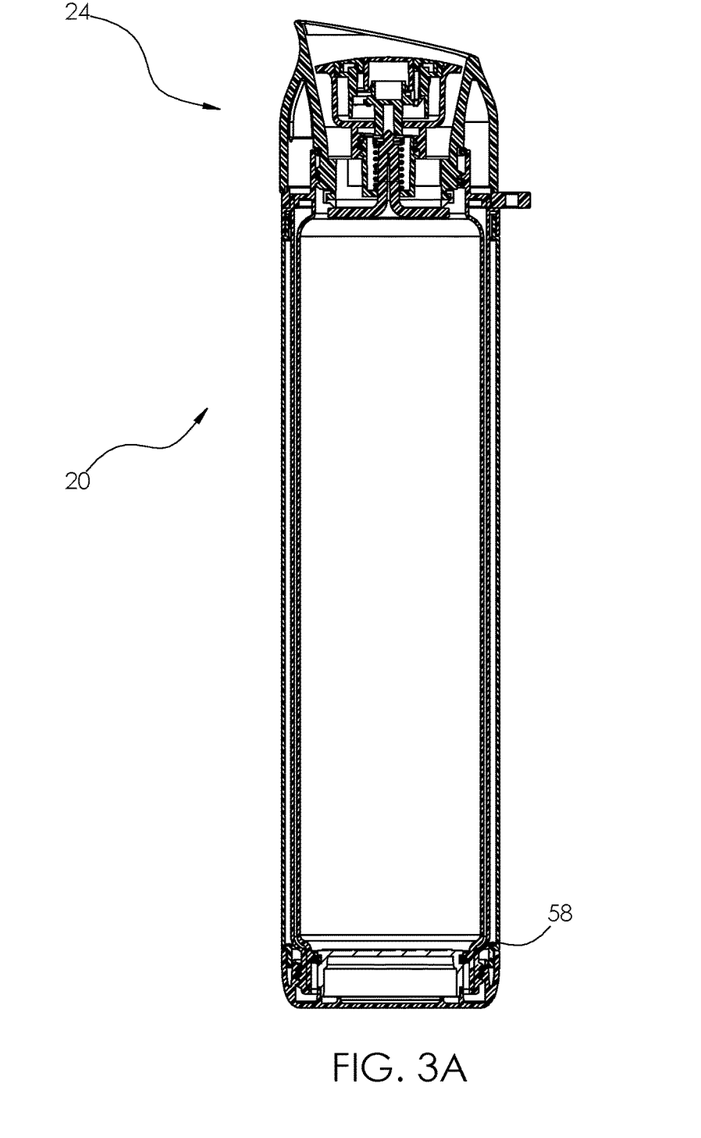
FIG. 3A is a cross-sectional view taken along line 3A-3A in FIG. 3.
Figure 4:
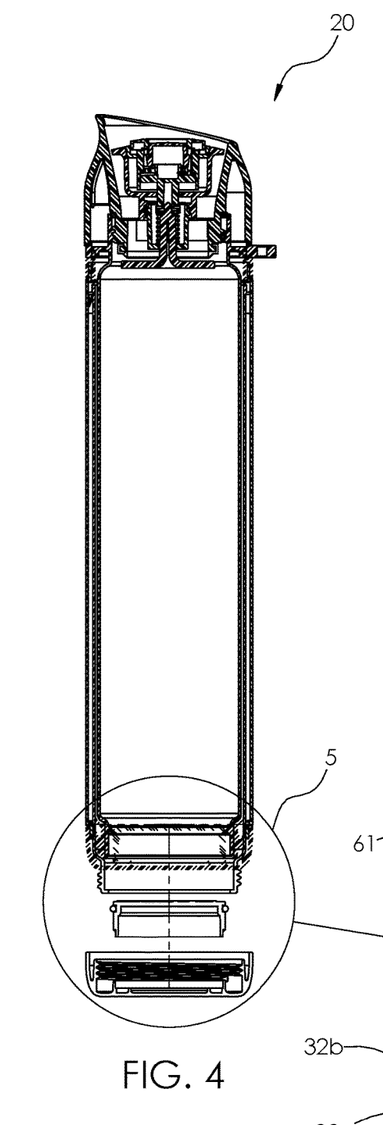
FIG. 4 is a cross-sectional view taken along line 3A-3A in FIG. 3 wherein an end cap is detached from the bottle.
Figure 5:
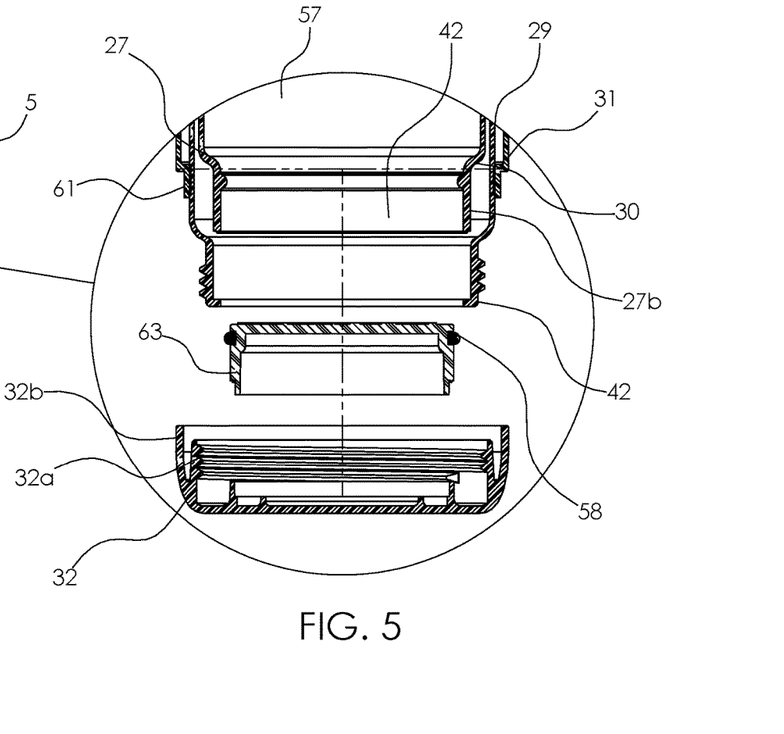
FIG. 5 is an enlarged view of the section 5 taken in FIG. 4.
Figure 8:
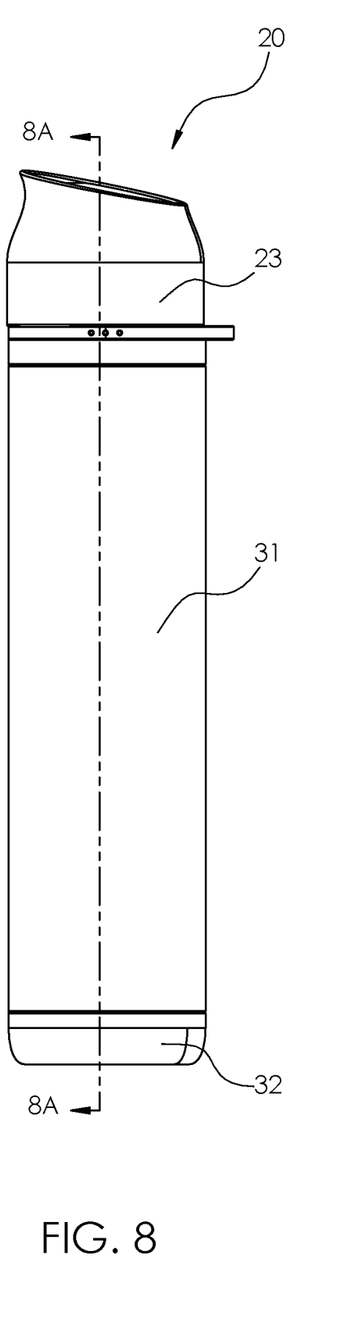
FIG. 8 is a side-elevational view of the bottle shown in FIG. 1.
Figure 8A:
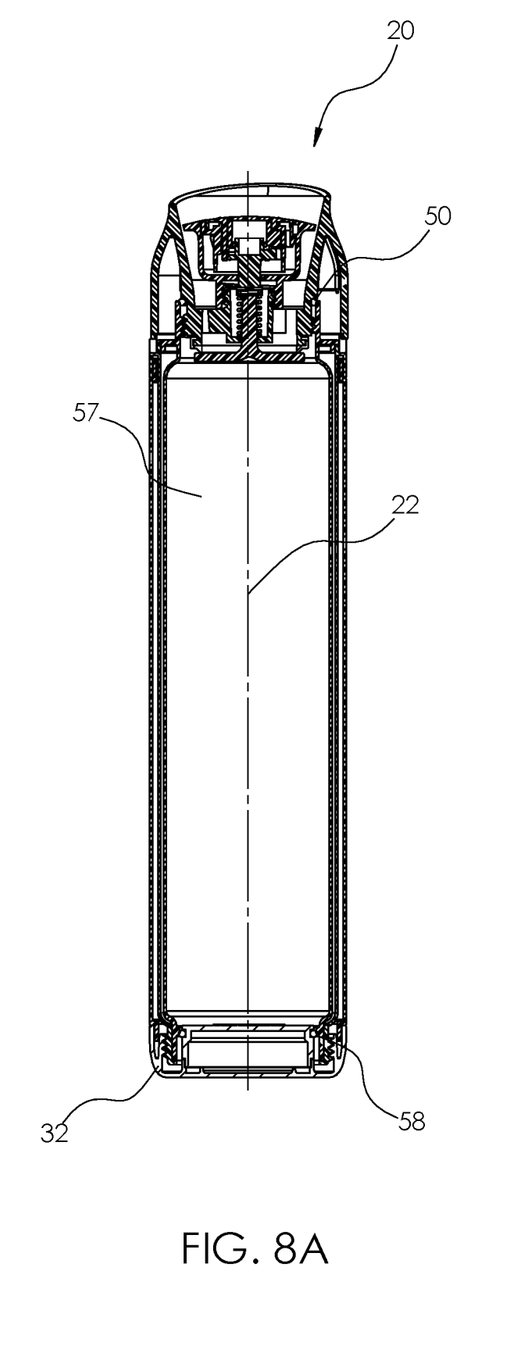
FIG. 8A is a cross-sectional view taken along line 8A-8A in FIG. 8.
Figure 9:
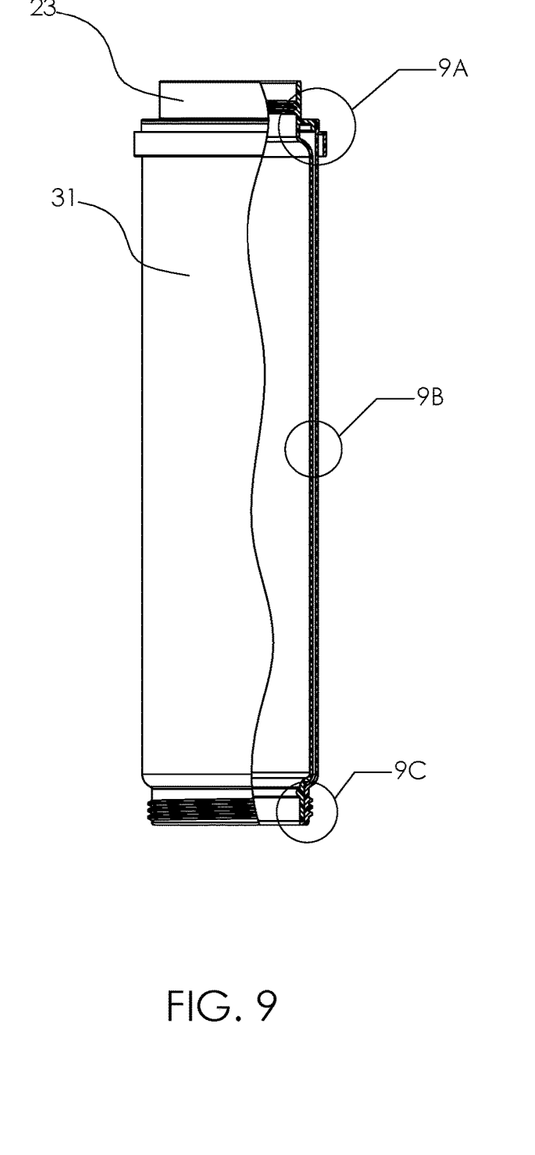
FIG. 9 is a side-elevational view of the bottle wherein the cap housing has been removed from the plug assembly.
Figure 9A:
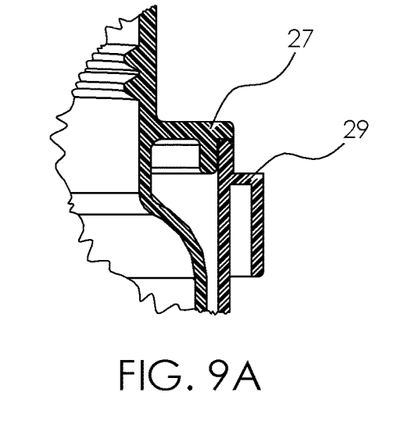
FIG. 9A is an enlarged view of section 9A taken in FIG. 9.
Figure 9B:
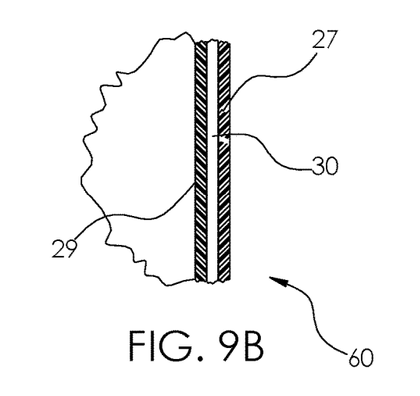
FIG. 9B is an enlarged view of section 9B taken in FIG. 9.
Figure 9C:
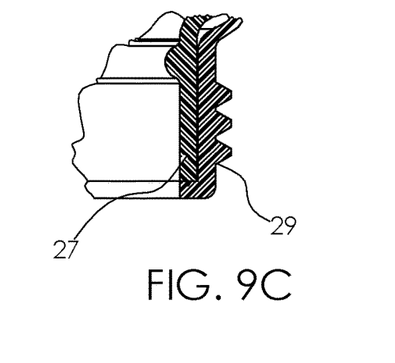
FIG. 9C is an enlarged view of section 9C taken in FIG. 9.
Figure 10:
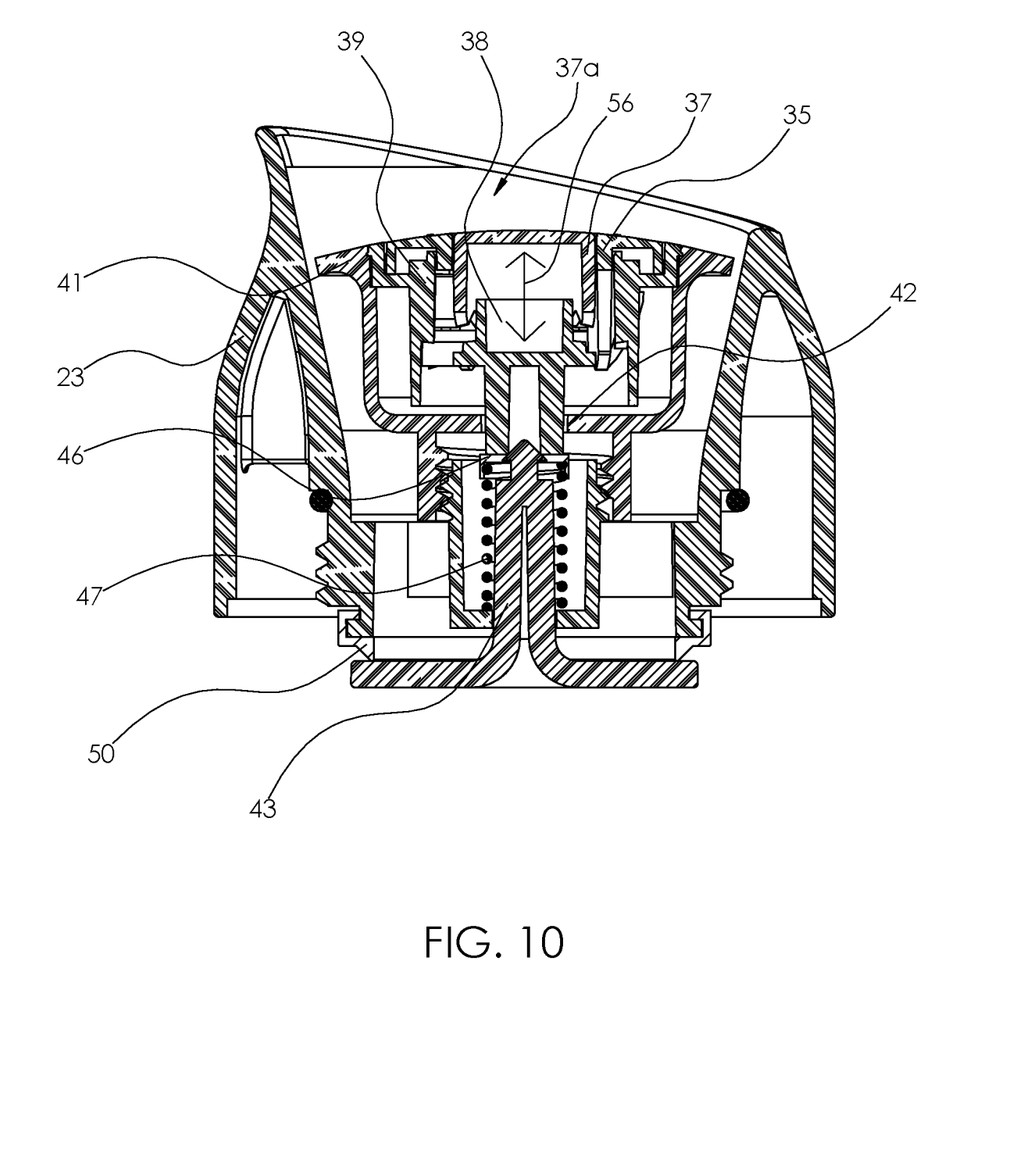
FIG. 10 is an enlarged cross-sectional view of the plug assembly wherein the open button is released.

A non-limiting exemplary embodiment(s) of the present disclosure is referred to generally in FIGS. 1-14 and is intended to provide a specially designed interchangeable vacuum-sealed beverage bottle 20 including interchangeable/replaceable components that can be changed after extended use. It should be understood that the exemplary embodiment(s) may be used to carry a single, hot/cold liquid, and should not be limited to any particular hot/cold liquid described herein.

Referring to FIGS. 1-14 in general, in a non-limiting exemplary embodiment(s), the interchangeable, vacuum-sealed beverage bottle 20 includes a body 21 provided with a centrally registered longitudinal axis 22. Such a body 21 includes a cap housing 23, a plug assembly 24 adjustably disposed at the cap housing 23, a handle 25 engaged to a bottom portion 23a of the cap housing 23, an inner flask 27 having a first open top end 28 in fluid communication with the plug assembly 24, and an outer flask 29 sealed to the inner flask 27 such that a sealed vacuum cavity 30 is defined between an outer surface of the inner flask 27 and an inner surface of the outer flask 29 (e.g., single liquid-containing chamber is double-walled and a vacuum is created between the walls). Advantageously, the inner flask 27 is statically and permanently coupled to the outer flask 29.

The body 21 further includes an exterior cover 31 removably positioned about the inner flask 27 and the outer flask 29, and an end cap 32 detachably mated to the exterior cover 31 and the outer flask 29. Advantageously, downward and upward axial displacement (along directional arrow 33) of a portion of the plug assembly 24 permits and prohibits fluid to freely flow outwardly from the inner flask 27 to an exterior of the plug assembly 24, respectively.

In a non-limiting exemplary embodiment, the inner flask 27 stores one type of liquid at a time. The inner flask 27 and outer flask 29 are sealed together and are removable from the exterior cover 31 thereby providing a quick-detachable combined flask (bottle 20). The inner and outer flasks 27, 29 are welded at their bottoms and tops. To remove the combined flasks (e.g., welded inner and outer flasks 27, 29), the user unscrews the end cap 32 from the exterior cover 31 and simply removes the combined flasks 27, 29. The combined flasks 27, 29 can have a different color, can be purchased separately, and replaced by the user as needed.

In a non-limiting exemplary embodiment, the plug assembly 24 includes a close button 35 having a central aperture 36 and located at an upper portion of the body 21, an open button 37 centrally aligned within an inner perimeter 36a of the central aperture 36, an actuator 38 engaged with the open button 37 and extended downwardly therefrom, a stator 39 having a central passageway 39a and a plurality of finger-like protrusions 40 equidistantly spaced about the central passageway 39a, and a valve housing 41 containing the close button 35, the open button 37, and the stator 39 therein. Notably, the actuator 38 is partially disposed exterior of an open bottom end 42 of the valve housing 41. The plug assembly 24 further includes a valve 43 having a central protrusion 45 extended upwardly towards the actuator 38 and aligned with the centrally registered longitudinal axis 22, a washer 46 engaged with a top portion of the central protrusion 45 and juxtaposed subjacent to the actuator 38, a spring 47 positioned about the central protrusion 45 and being selectively compressed and decompressed when the open button 37 is reciprocated between a tensioned position 37b and a resting position 37a, respectively, and a first seal 50 seated about a lower portion of the valve 43 and engaged with the inner flask 27.

The plug assembly 24 acts as a controller and provides an ergonomic mouth for drinking, which also functions as a stopper closing the neck of the bottle 20. When drinking, valve 43 is opened to quickly fill the bottle 20. Additionally, a user can unscrew the plug assembly 24 from the inner flask 27 and pour the liquid through the neck of the bottle 20. To open the plug assembly 24 and drink liquid, press the central open button 37, after drinking, press the outer close button (e.g., close button 35) to close the plug assembly 24.

As perhaps best shown in FIGS. 6A, 7A, and 11-14, when the open button 37 is pressed downwardly, the actuator 38 also moves down and simultaneously rotates due to the angularly offset protrusions 40 of the stator 39. At the end of its movement, the actuator 38 is blocked by the protrusions 40 on the stator 39 and thus valve 43 remains in the pressed (lowered) open position because the open button 37 cannot rise upwardly (the open button 37 is coupled to the actuator 38). Such protrusions 40 are equidistantly offset from the centrally registered longitudinal axis 22 and preferably obliquely angled at approximately 45 degrees relative to a horizontal plane 52, as shown in FIGS. 11-14 (angular and rotational path along which actuator travels when open button pressed downwardly). Such protrusions 40 create a serrated edge 40a extending about an annular perimeter 54 of the stator 39. The protrusions 40 frictionally engage the actuator 38 when the open button 37 is pressed downwardly. In this position, the actuator 38 blades 38a contact the protruding arms 55 of the close button 35 and lift the close button 35 (see FIGS. 11-14) relative to a resting equilibrium position 37a. Thus, while the valve 43 is open (open button 37 pressed down and the actuator 38 is locked), the close button 35 remains raised. Pressing down the close button 35 disengages the actuator 38 from the stator 39 and releases the open button 37 to rise upwardly to its original equilibrium position 37a.

In a non-limiting exemplary embodiment, when the open button 37 is pressed, the actuator 38 also moves down and simultaneously rotates. At the end of its movement, the actuator 38 is blocked by a protrusion 40 on the stator 39 and thus the valve 43 remains in the open position. In this open position, the actuator 38 blades come into contact with the protruding parts 40 of the close button 35 and lifts the close button 35 (see FIGS. 11-14). Thus, while the valve 43 is open and the actuator 38 is locked, the close button 35 remains raised and a user is able to drink fluid from the bottle 20.

In a non-limiting exemplary embodiment, the open button 37, the close button 35, and the actuator 38 are operably coupled to the stator 39.

In a non-limiting exemplary embodiment, the open button 37 is selectively reciprocated between the resting position 37a and the tensioned position 37b along a linear travel path 56 oriented parallel to the centrally registered longitudinal axis 22.

In a non-limiting exemplary embodiment, the close button 35 is elevated above the resting position 37a of the open button 37, when the open button 37 is downwardly displaced to the tensioned position 37b. In this manner, the open button 37 is caused to rise along the linear travel path 56 when the close button 35 is depressed downwardly.

Drinking liquid flows through the cavity 57 of the inner flask 27. This cavity 57 and the plug assembly 24 minimize the "dead volume" in which liquid can accumulate after drinking. This eliminates the sudden flow of liquids and the blotting of things in which the bottle 20 is transported.

The plug assembly 24 and the end cap 32 seal the bottle 20 by means of O-rings 58. Such a sealing mechanism is designed in such a way that, when screwing the parts, the sealing rings 50, 58, the end cap 32 and the plug assembly 24 are mainly subjected to tangential forces for separation, which makes it more comfortable to twist the end cap 32 and the plug assembly 24 without "stopping" into the seal or damaging the seal.

In a non-limiting exemplary embodiment, the inner flask 27 includes a first hollow cavity 57 (containing a single liquid), and a first open bottom end 42 axially opposed from the first open top end 28.

In a non-limiting exemplary embodiment, the outer flask 29 includes a second open top end 59 and a second open bottom end 65 axially opposed therefrom. Notably, the sealed vacuum cavity 30 is disposed about an outer perimeter 27b of the inner flask 27 and extended along a major longitudinal length of the outer flask 29.

Advantageously, the inner flask 27 directly contains drinking liquids and has a double wall 60. Such a double wall 60 is created with the inner flask 27 and outer flask 29. In this manner, a vacuum-sealed cavity 30 at zero air pressure to maintain the temperature of the drinking liquid filled into the inner flask 27. The inner flask 27 and outer flask 29 are connected by ultrasonic welding thereby forming the vacuum-sealed cavity 30.

In a non-limiting exemplary embodiment, the vacuum-sealed cavity 30 surrounds an entire circumferential outer perimeter 27b of the inner flask 27 and thereby insulates the liquid housed inside the inner flask 27.

In a non-limiting exemplary embodiment, the exterior cover 31 includes a third open top end 61 and a third open bottom end 62 axially opposed therefrom. In this manner, each of the inner flask 27 and the outer flask 29 are removably situated between the third open top end 61 and the third open bottom end 62.

In a non-limiting exemplary embodiment, the end cap 32 includes a threaded inner wall 32a and an outer wall 32b concentrically and equidistantly spaced about the threaded inner wall 32a, an insert 63 centrally disposed at the end cap 32 and equidistantly spaced inwardly from the threaded inner wall 32a, and a second seal 58 circumscribed about the insert 63. Advantageously, the threaded inner wall 32a is removably coupled to the second open bottom end 42 of the outer flask 29, wherein the outer wall 32b is frictionally engaged with the third open bottom end 61 of the exterior cover 31.

At an upper portion of the bottle 20, beneath the plug assembly 24, a quick-detachable ring 65 is position. The ring 65 (e.g., handle 25) can serve as a handle 25 or attach to a belt, for example, to easily carry the bottle 20. The ring 65 is worn on the body 21 of the bottle 20 and is centered by a stopper-valve. Thus, the ring 65 can be located in any convenient angular position, and easily replaced if necessary. The ring 65 can be made in different colors.

The present disclosure further includes a method for utilizing a beverage bottle 20 including the initial step of: providing a body 21 provided with a centrally registered longitudinal axis 22 wherein the body 21 includes a cap housing 23, a plug assembly 24 adjustably disposed at the cap housing 23, a handle 25 engaged to a bottom portion 26 of the cap housing 23, an inner flask 27 having a first open top end 28 in fluid communication with the plug assembly 24, an outer flask 29 sealed to the inner flask 27 such that a sealed vacuum cavity 30 is defined between an outer surface of the inner flask 27 and an inner surface of the outer flask 29, an exterior cover 31 removably positioned about the inner flask 27 and the outer flask 29, and an end cap 32 detachably mated to the exterior cover 31 and the outer flask 29. Advantageously, the inner flask 27 is statically and permanently coupled to the outer flask 29. The method further includes the step of: axially displacing 33 of a portion of the plug assembly 24 downwardly and upwardly thereby permitting and prohibiting fluid to freely flow outwardly from the inner flask 27 to an exterior of the plug assembly 24, respectively.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A beverage bottle comprising: a body provided with a centrally registered longitudinal axis, said body including
   a cap housing;
   a plug assembly disposed at said cap housing;
   a handle engaged to a bottom portion of said cap housing;
   an inner flask having a first open top end in fluid communication with said plug assembly;
   an outer flask sealed to said inner flask such that a sealed vacuum cavity is defined between an outer surface of said inner flask and an inner surface of said outer flask;
   an exterior cover removably positioned about said inner flask and said outer flask; and
   an end cap detachably mated to said exterior cover and said outer flask;
   wherein downward and upward axial displacement of a portion of said plug assembly permits and prohibits fluid to freely flow outwardly from said inner flask to an exterior of said plug assembly, respectively.

2. The beverage bottle of claim 1, wherein said plug assembly comprises:
   a close button having a central aperture and located at an upper portion of said body;
   an open button centrally aligned within an inner perimeter of said central aperture;

an actuator engaged with said open button and extended downwardly therefrom;
a stator having a central passageway and a plurality of protrusions equidistantly spaced about said central passageway;
a valve housing containing said close button, said open button, and said stator therein, said actuator being partially disposed exterior of an open bottom end of said valve housing;
a valve having a central protrusion extended upwardly towards said actuator and aligned with the centrally registered longitudinal axis;
a washer engaged with a top portion of said central protrusion and juxtaposed subjacent to said actuator;
a spring positioned about said central protrusion and being selectively compressed and decompressed when said open button is reciprocated between a tensioned position and a resting position, respectively; and
a first seal seated about a lower portion of said valve and engaged with said inner flask.

3. The beverage bottle of claim 2, wherein said open button, said close button, and said actuator are operably coupled to said stator.

4. The beverage bottle of claim 3, wherein said open button is selectively reciprocated between the resting position and the tensioned position along a linear travel path oriented parallel to the centrally registered longitudinal axis.

5. The beverage bottle of claim 4, wherein said close button is elevated above said resting position of said open button when said open button is downwardly displaced to said tensioned position, wherein said open button is caused to rise along the linear travel path when said close button is depressed downwardly.

6. The beverage bottle of claim 5, wherein said inner flask comprises:
a first hollow cavity; and
a first open bottom end axially opposed from said first open top end.

7. The beverage bottle of claim 6, wherein said outer flask comprises:
a second open top end and a second open bottom end axially opposed therefrom;
wherein said sealed vacuum cavity is disposed about an outer perimeter of said inner flask and extended along a major longitudinal length of said outer flask.

8. The beverage bottle of claim 7, wherein said sealed vacuum cavity surrounds and entire circumferential outer perimeter of said inner flask and thereby insulates the liquid housed inside said inner flask.

9. The beverage bottle of claim 8, wherein said exterior cover comprises:
a third open top end and a third open bottom end axially opposed therefrom, wherein each of said inner flask and said outer flask are removably situated between said third open top end and said third open bottom end.

10. The beverage bottle of claim 9, wherein said end cap comprises:
a threaded inner wall and an outer wall concentrically and equidistantly spaced about said threaded inner wall;
an insert centrally disposed at said end cap and equidistantly spaced inwardly from said threaded inner wall; and
a second seal circumscribed about said insert;
wherein said threaded inner wall is removably coupled to said second open bottom end of said outer flask;
wherein said outer wall is frictionally engaged with said third open bottom end of said exterior cover.

11. A beverage bottle comprising: a body provided with a centrally registered longitudinal axis, said body including
a cap housing;
a plug assembly adjustably disposed at said cap housing;
a handle engaged to a bottom portion of said cap housing;
an inner flask having a first open top end in fluid communication with said plug assembly;
an outer flask sealed to said inner flask such that a sealed vacuum cavity is defined between an outer surface of said inner flask and an inner surface of said outer flask;
an exterior cover removably positioned about said inner flask and said outer flask; and
an end cap detachably mated to said exterior cover and said outer flask;
wherein downward and upward axial displacement of a portion of said plug assembly permits and prohibits fluid to freely flow outwardly from said inner flask to an exterior of said plug assembly, respectively;
wherein said inner flask is statically and permanently coupled to said outer flask.

12. A method for utilizing a beverage bottle comprising the steps of:
providing a body provided with a centrally registered longitudinal axis, said body including a cap housing, a plug assembly adjustably disposed at said cap housing, a handle engaged to a bottom portion of said cap housing, an inner flask having a first open top end in fluid communication with said plug assembly, an outer flask sealed to said inner flask such that a sealed vacuum cavity is defined between an outer surface of said inner flask and an inner surface of said outer flask, an exterior cover removably positioned about said inner flask and said outer flask, and an end cap detachably mated to said exterior cover and said outer flask, wherein said inner flask is statically and permanently coupled to said outer flask; and
axially displacing of a portion of said plug assembly downwardly and upwardly thereby permitting and prohibiting fluid to freely flow outwardly from said inner flask to an exterior of said plug assembly, respectively.

* * * * *